United States Patent [19]

Loriot

[11] Patent Number: 4,905,159

[45] Date of Patent: Feb. 27, 1990

[54] METHOD AND APPARATUS FOR CUTTING OUT PIECES FROM A FABRIC HAVING A REPETITIVE DESIGN THEREON

[75] Inventor: Jean-Marc Loriot, Paris, France

[73] Assignee: Vestra, Bischwiller, France; a part interest

[21] Appl. No.: 138,754

[22] Filed: Dec. 29, 1987

[30] Foreign Application Priority Data

Dec. 31, 1986 [FR] France ................................ 8618490

[51] Int. Cl.[4] ................................ G06F 15/00

[52] U.S. Cl. ................................ 364/470; 382/48; 356/430

[58] Field of Search ........... 364/200, 900, 470, 474.13, 364/474.34, 559, 478, 475, 468, 474.09; 382/48, 31, 9; 356/430, 431, 432, 394

[56] References Cited

U.S. PATENT DOCUMENTS 4,136,332 1/1979 Kadota et al. ........................ 382/45
4,149,246 4/1979 Goldman ............................ 364/900
4,630,225 12/1986 Hisano ................................ 364/559
4,675,253 6/1987 Bowditch ............................ 364/470
4,758,960 7/1988 Jung .................................. 364/474.13

*Primary Examiner*—Allen MacDonald
*Attorney, Agent, or Firm*—Sughrue, Mion, Zinn, Macpeak and Seas

[57] ABSTRACT

A method of cutting out pieces which are to be assembled from a length of check fabric 1 in order to obtain continuity or alignment in the design on the fabric at at least some of the assembly points includes the steps of placing a length of fabric on a cutting-out table 2, storing the shapes, positions, and orientations of the pieces to be cut out in a computer memory, with a margin having a width equal to one half of a design element being reserved around some of the pieces in one or two directions, and also storing the positions of points A, B which are to coincide when the pieces are assembled. A pair of images of the fabric, each centered on a corresponding one of the points, are displayed on a screen 8 side by side, and linear and/or angular offsets between the designs are observed, whereafter any offsets are corrected such that the designs correspond in at least one direction.

6 Claims, 2 Drawing Sheets

METHOD AND APPARATUS FOR CUTTING OUT PIECES FROM A FABRIC HAVING A REPETITIVE DESIGN THEREON

The present invention relates to a method and apparatus for cutting pieces out from sheet material having a design thereon which repeats periodically in one or two directions, for example a check fabric.

BACKGROUND OF THE INVENTION

When the different pieces that go to making up a garment are cut out from a length of fabric, it is desirable to reduce wastage by placing the patterns of the pieces to be cut out on the length of fabric as well as possible, thereby defining a cutting-out plan. If the design on the fabric repeats in two directions, for example if the fabric is a check fabric, it is preferable from the point of view of appearance for the patterns in the design to match at the joints or seams between at least some of the pieces. Thus, in the case of a check jacket, it is desirable to align the horizontal lines of the front of the jacket with those on the sleeve, at the armhole. Similarly, it may be preferable to avoid interrupting the continuity of lines in a check design at a patch pocket or at a pocket flap. It may also be desirable to align the design with certain parts of the outline of a piece or to position the design symmetrically between pieces to be cut out.

In the prior art, pieces are cut out from fabric as follows: after cutting out a reference piece, or at least after having fixed its position on a length of fabric, matching points or "notches" are selected around the outline of the reference piece and around the outline of a second piece, which "notches" should meet one another when the pieces are sewn together, regardless of whether the fabric is a check fabric or not. Thereafter, a pattern having the dimensions of the second piece and made of tissue, for example, is placed on the length of fabric in such a manner that the design on the check fabric lines up at the correspondence points or "notches" so as to obtain the desired continuity in the design after the two pieces have been assembled.

The aim of the present invention is to provide a method and an apparatus for positioning and cutting out pieces from a check fabric or from a fabric having a similar design thereon without requiring human intervention directly on the patterns of the pieces or on the fabric, said apparatus making it possible in most cases for the entire positioning and cutting-out operation of said pieces to be taken charge of from the shapes of the pieces and from a given cutting-out plan, while taking account, inter alia, of the need to match the design on a fabric between assembled pieces, e.g. when making up a garment.

SUMMARY OF THE INVENTION

The present invention provides a method of cutting out pieces for being assembled together, said pieces being cut out from sheet material having a design thereon which is periodic in one or two directions, and in particular from a length of check fabric, for the purpose of obtaining continuity or alignment in the design where at least some of the pieces are assembled, with the positions of the pieces on the length of fabric being already determined for at least some of the pieces with a margin which is not less than one half of the elementary design in one or two directions, the method being characterized in that it comprises the following steps:

the length of fabric is disposed on a cutting-out table;

the shapes, positions, and orientations of the pieces to be cut out are stored in the memory of a computer system, in particular of the type comprising at least one computer loaded with appropriate software, with a margin corresponding to at least one half of a design element being reserved between the outlines of said at least some pieces in one or two directions, and with the points that are to coincide in the pieces after assembly also being stored;

for each correspondence between points, a pair of images is taken of said length of fabric, with each image being substantially centered over a corresponding one of said points, said images being taken by at least one camera connected to said computer system and being disposed over said length of fabric, with the co-ordinates of the camera in a frame of reference relating to the cutting-out table being controlled by said computer system;

the two images are displayed on a screen and any linear and/or angular offset between the designs is observed, in particular by juxtaposing or superposing the designs of the images;

any observed offset is corrected by means of an input accessory to said computer system, for example a keyboard or a joystick, by acting on said input accessory so as to make the designs of said images match, at least in one direction, and then to validate the correction so as to store it in the memory of the computer; and the above steps are repeated for other pieces to be cut out;

said software processing the information stored in the memory of the computer system, namely:

the shapes, positions, and orientations of the pieces to be cut out; and said corrections;

in order to define a new cutting-out program in which design continuity is ensured where said pieces are assembled.

In an advantageous variant of the invention, said images are digitized and inputted to the computer system under the control of more elaborate software, and the computer system analyses the design and itself establishes the corrections that need to be made in order to correct said offsets, so as to define a new cutting-out program. To do this, the computer system itself looks for the best possible correspondence between the designs and the direction in which they are to match.

It is thus possible, to obtain a cutting-out program for the fabric that satisfies constraints related to a fabric having a design thereon, on the basis of those points which are selected as points on different pieces that must match, and on the basis of a particular positioning of the pieces relative to each other (i.e. a cutting-out plan) while leaving a margin of at least one half of the design pattern around some of the pieces in one or both directions.

It is already known to use a computer to automatically position the lines of cut around pieces of arbitrary shape in order to reduce wastage, and similarly it is also known to perform automatic cutting out per se of a length of fabric using a knife or any other appropriate cutting means under the control of the computer having a cutting-out program but taking no account of a design on the fabric. The invention therefore serves to complete a process for cutting out pieces of fabric from a fabric having a design which repeats periodically in one or two dimensions, said process being based solely on the shapes and orientations of the pieces and on a knowledge of the correspondence points, once the length of fabric has been placed on a cutting out table.

Apparatus for implementing the method of the present invention is mainly constituted by:

a matrix or linear video camera;

a moving support capable of moving over a fixed table;

a computer system, in particular of the type including at least one computer;

a computer terminal having a monitor screen and an input accessory; and an image-storing device for storing images.

According to the invention, the camera is fixed to the moving support and the computer system controls the position of the support. The camera is connected to the computer system by means of the image storing device and the computer system can store camera images of a length of fabric spread out over the cutting-out table. These images are associated by the computer system with the position of the camera above the length of fabric. The computer system has a cutting-out plan stored in its memory indicating the shapes, the orientations, and the positions of the pieces to be cut out from the length of fabric relative to the cutting-out table or optionally relative to reference marks on the length of fabric, together with the positions of the forced correspondence points between the pieces to be assembled. In the cutting-out program, a margin of at least one half of the design width is left in one or both directions around at least some of the pieces to be cut out.

In order to determine a precise cutting-out plan, i.e. a plan which takes account of the constraint of obtaining continuity in the design across the correspondence points, the computer system controls the camera to take up a position above the length of fabric so as to send a first image of the fabric centered on a correspondence point of said "reference" piece relative to which the other pieces are to be aligned. The computer system then stores this first image in memory and controls the camera to take up a position over the corresponding correspondence point of another piece. The computer system stores the second image which it then receives from the camera and it displays on the monitor screen either the two images superposed on each other with the possibility of adjusting the brightness of each image independently, or else two half-images which are cut and juxtaposed along a line passing through the correspondence points which are caused to coincide. An operator can then act on the computer input accessory in order to line up the designs by moving one of the two images relative to the other. When the match appears satisfactory, the operator validates the position in question and the computer system then knows what correction needs to be applied to the cutting out plan as previously supplied thereto in order to ensure that the designs match.

In an advantageous embodiment of the present invention, the said computer system comprises two computers: a first computer for controlling the position of the camera over the length of fabric; and a second computer, connected to the first, which takes charge of image processing and of the dialog with the operator, and also of finding the appropriate correction. The first computer may also be the computer for controlling the path of a knife for cutting out the length of fabric.

Several configurations are possible for the camera(s):

said at least one camera is fixed and transmits an overall image of at least a portion of said length of fabric to said computer system, with said computer system extracting said pairs of images from said overall image; or said at least one camera is displaced over the length of fabric.

BRIEF DESCRIPTION OF THE DRAWINGS

Implementations of the invention are described by way of example with reference to the accompanying drawings, in which.

MORE DETAILED DESCRIPTION

Figure 1:
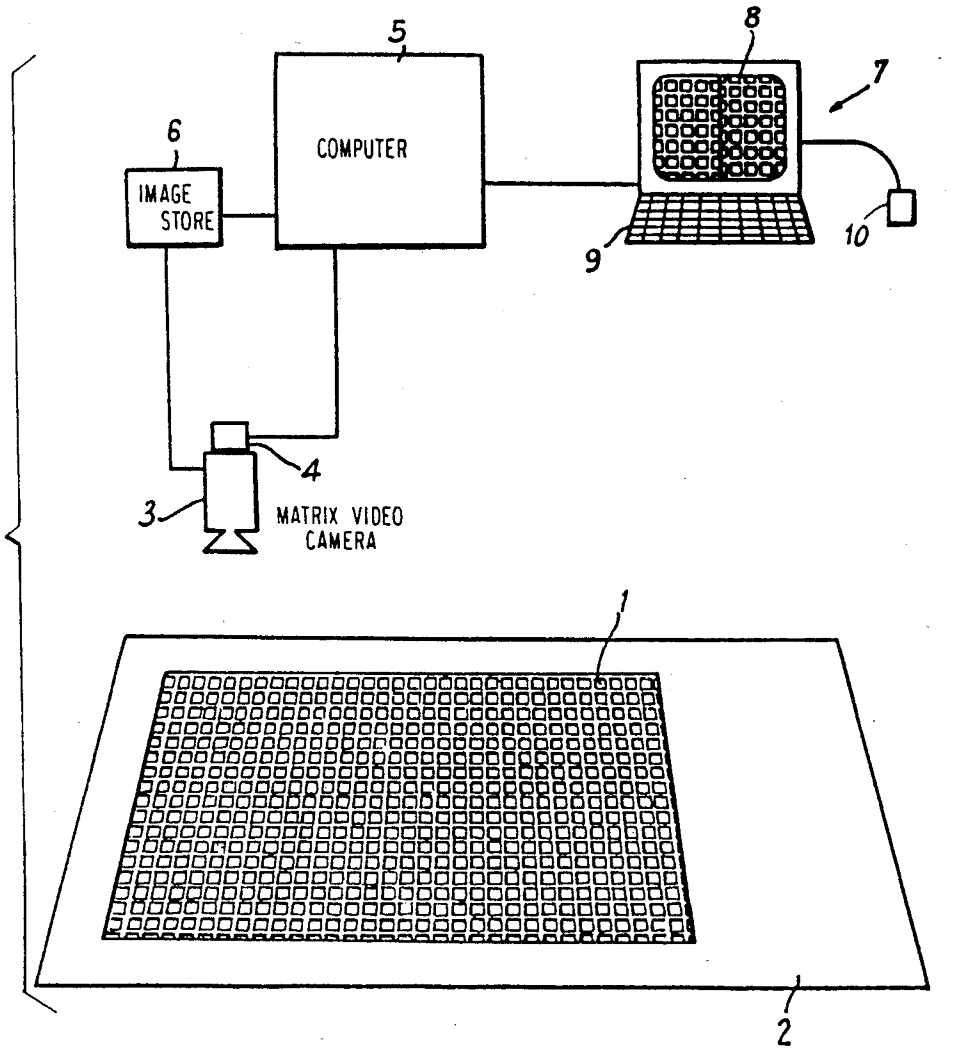
FIG. 1 is a block diagram of apparatus in accordance with the invention.

In the block diagram of FIG. 1, a length of fabric 1 is disposed on a cutting-out table 2. A matrix video camera 3 is fixed to a moving support 4 which is capable of moving over the cutting out table. The camera is connected to a computer 5 by means of an image storing device 6. The moving support 4 is connected to the computer so as to enable the computer to control the position of the camera 3 over the cutting-out table 2. A computer terminal 7 including a monitor screen 8, a keyboard 9, and an input accessory 10 are also connected to the computer 5. The computer 5 is capable of controlling the moving support 4 and it receives images of the length of fabric from the camera 3. By virtue of the image storing device, it is capable of storing selected images for subsequent processing.

Figure 2:
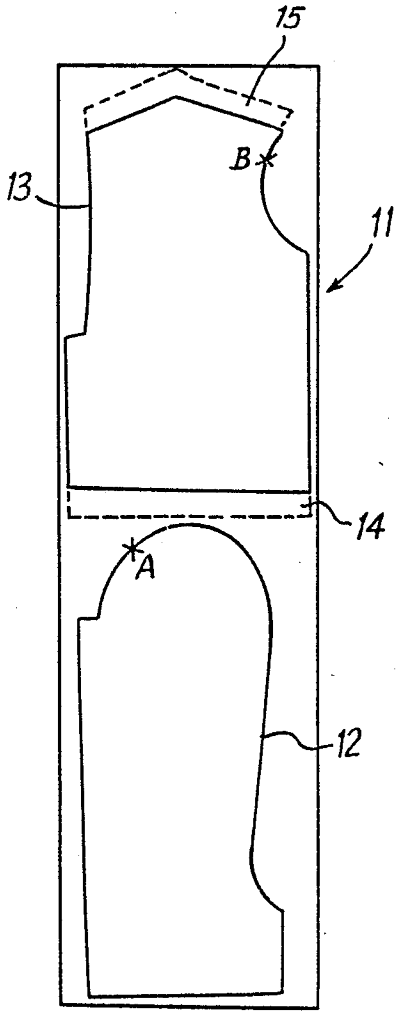
FIG. 2 shows a cutting-out plan for use by the apparatus in accordance with the invention.

In FIG. 2, a cutting-out plan 11 has been drawn in a rectangular frame which may correspond to the outline of a length of fabric having a repeating design thereon and from which pieces are to be cut. In this simple case there are only two pieces to cut out, a first or "reference" piece 12 and a second piece 13, with said pieces being defined by their outlines on the drawing. When the two pieces are assembled, points A and B on the first piece and the second piece respectively are required to coincide for a proper assembly, regardless of the design on the fabric. The points A and B are referred to as correspondence points (and are sometimes called "notches"). Margins 14 and 15 having a width of one half of the design are provided in one direction only at either end of the second piece 13.

The information contained in the cutting-out plan of FIG. 2 is stored in the computer 5. The computer then controls the support 4 of the camera 5 to bring the camera vertically over the cutting-out table on which the length of fabric 1 is spread, and to place the camera in a position for taking a first image of the length of fabric centered on correspondence point A. Once this image has been sorted by the computer, using the image-storing device 6, the computer controls the support to bring the camera over correspondence point B so that the camera can supply a second image of the length of fabric centered on correspondence point B. The computer then processes both images together so as to generate a display on the monitor screen 8 of the computer terminal 7.

Figure 3A:
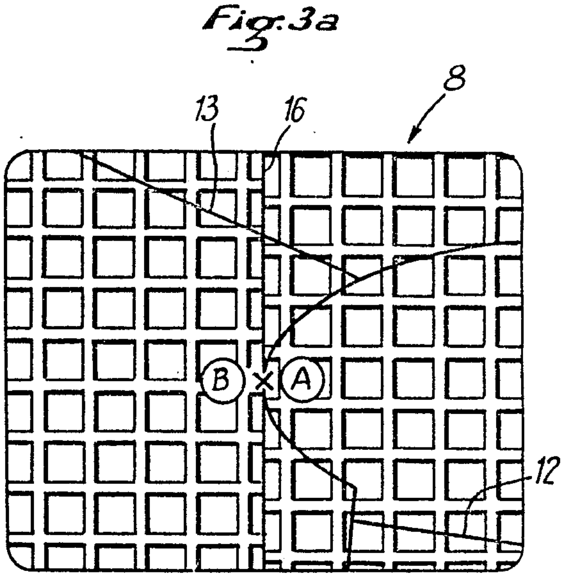
FIGS. 3*a* and 3*b* show the displays on the screen of the apparatus in accordance with the invention.
Figure 3B:
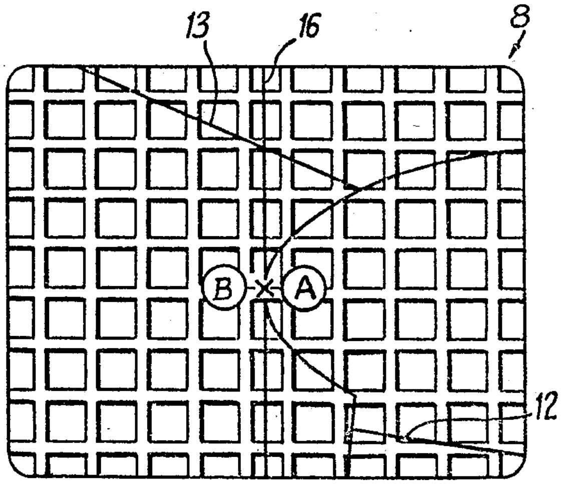

FIG. 3*a* shows the display shown to a user of the FIG. 1 device prior to the piece 13 being accurately positioned relative to the length of fabric 1. In this example of an embodiment of an invention, the computer displays a portion of said first image on the lefthand side of the screen 8 and a portion of said second image on the righthand side of the screen, together with the outlines of the two pieces 12 and 13. The two portions of the image are juxtaposed on the screen and are separated by a line of separation 16 passing through the two correspondence points A and B which are caused to coincide on the screen. Before the user intervenes, the designs on the images of the length of fabric do not, in general match along the separation line 16, and this non-matching situation is shown in FIG. 3*a*. In order to inform the computer of the correction which needs to be made in the cutting-out plan so that the designs match when the two pieces are assembled, the user has the possibility of shifting the design of one of the portions of the image (in this case the righthand portion) until it matches along the separation line 16, as shown in FIG. 3*b*. In order to shift the image on the screen, the user may either act directly on the keyboard 9, or else on the computer input accessory 10. When the operator is satisfied, i.e. when the display corresponds to that shown in FIG. 3*b*, the user validates the correction using a key on the keyboard 9, and the computer then knows the correction to be applied to the cutting-out plan in order to define a new cutting-out program so that the design matches when the two pieces are assembled.

In an advantageous variant of the invention, the monitor screen is no longer required since the computer is loaded with more elaborate software and is capable of determining the corrections to be performed, on its own.

In practice, there are more than two pieces to be cut out in any one cutting-out plan, for example there by be about twenty pieces. In order to position the other pieces, the method proceeds in the same manner using either the same reference piece or else some other piece whose position has already been corrected.

A piece may be positioned relative to two other pieces, which requires two corrections to be provided in two different directions. To do this, more than two images may be displayed on the screen.

Once the cutting-out plan has been corrected for one piece, the computer can cause said piece to be cut out, while simultaneously correcting the positioning of other pieces, thereby obtaining a considerable saving in time.

More generally, the device in accordance with the invention can be used to correct either interactively on the screen or automatically on its own the position or the orientation of the design relative to the outlines of the parts to be cut out. The corrections may be decided on as a function of various criteria relating to appearance, for example the orientation of the design relative to a line of sewing, the need for the design to be placed symmetrically relative to an assembly of symmetrical pieces, or the place which the design should occupy on a given piece to be cut out.

Further, it is possible to define a dependence between the positions of the pieces relative to one another, with several pieces being displaced simultaneously so as to keep a given concordance while displacing the design relative to the entire assembly. Several pieces may be displaced relative to another piece, or a single piece may be displaced relative to a piece which has already been displaced.

The invention has been described for cutting-out purposes, however it is equally applicable to other actions that need performing on an object which is marked with a periodic or repetitive design, for example machining, marking, etc. ... . It is naturally applicable to working in materials other than fabric, for example any sheet or plate material having a design which repeats in one or more directions.

The invention is also applicable to positioning and cutting out pieces in three dimensions.

I claim:

1. A method of cutting out pieces for assembly together, said pieces being cut out from sheet material having a design thereon which is regularly periodic in at least one direction, such as a length of fabric having a checked pattern thereon, the method serving to establish continuity or alignment in the design when at least two of the pieces are assembled, with the positions of the pieces on the length of fabric being previously determined for at least two of the pieces and including a margin which is not less than one half of a design element in at least one direction, the method comprising the following steps:

(a) disposing a length of fabric on a cutting-out table;

(b) storing shapes, positions, and orientations of the pieces to be cut out in a computer system memory, with a margin corresponding to at least one half of a design element being reserved between outlines of said at least two pieces in at least one direction;

(c) selecting and storing points (A,B) on edges of said at least two pieces which must coincide upon assembly;

(d) taking a pair of images of said length of fabric, with each image being substantially centered over a corresponding one of said points, using a camera connected to said computer system and disposed over said length of fabric, with co-ordinates of the camera in a frame of reference relating to the cutting-out table being controlled by said computer system;

(e) displaying the two images on a screen to observe any offset between adjacent design elements at said edges whereat said points lie, in particular by juxtaposing or superposing the designs of the images;

(f) correcting any observed offset by means of an input accessory to said computer system to establish design continuity between said images in said at least one direction, and (g) storing correction parameters of said offset in the computer memory to define a new cutting-out program in which design continuity is ensured when said pieces are assembled.

2. A method according to claim 1, wherein the outlines of the pieces appear on said screen.

3. A method according to claim 1, wherein said camera is movable over the length of fabric.

4. A method according to claim 1, wherein a plurality of cameras are moved over said length of fabric, with each camera supplying the computer with an image centered on one of said points.

5. A method according to claim 1, wherein said camera is fixed, and applies an overall image to said computer system of at least a portion of said length of fabric, said computer system then extracting said pairs of images from said overall image.

6. A method according to claim 1, wherein said images are digitized and inputted to the computer system, with the computer system then analyzing the images and itself deciding on the corrections to be provided in order to correct said offsets by seeking the best possible match between the designs in a direction in which they are to match, in order to define said new cutting-out program.

* * * * *